(12) United States Patent
Su et al.

(10) Patent No.: US 9,213,438 B2
(45) Date of Patent: Dec. 15, 2015

(54) OPTICAL TOUCHPAD FOR TOUCH AND GESTURE RECOGNITION

(75) Inventors: Ming-Chun Su, Fremont, CA (US); Cheng-Yu Tsai, Taoyuan (TW)

(73) Assignee: OmniVision Technologies, Inc., Santa Clara, CA (US)

(*) Notice: Subject to any disclaimer, the term of this patent is extended or adjusted under 35 U.S.C. 154(b) by 699 days.

(21) Appl. No.: 13/151,583

(22) Filed: Jun. 2, 2011

(65) Prior Publication Data

US 2012/0306815 A1 Dec. 6, 2012

(51) Int. Cl.
*G06F 3/042* (2006.01)
*G06K 9/00* (2006.01)

(52) U.S. Cl.
CPC ............ *G06F 3/042* (2013.01); *G06K 9/00046* (2013.01); *G06F 2203/0338* (2013.01); *G06F 2203/04104* (2013.01); *G06F 2203/04108* (2013.01); *G06F 2203/04109* (2013.01)

(58) Field of Classification Search
CPC ....... G06F 3/041; G06F 3/042; G06F 3/0421; G06F 2203/04109; G06F 2203/04101; G06F 2203/04106; G06F 2203/04108
USPC .......... 345/173, 175; 178/18.01, 18.03, 18.09
See application file for complete search history.

(56) References Cited

U.S. PATENT DOCUMENTS

| 5,083,044 A |   | 1/1992 | Mead et al. |
|---|---|---|---|
| 5,088,817 A | * | 2/1992 | Igaki et al. .......... G06K 9/00046 250/556 |
| 5,543,588 A |   | 8/1996 | Bisset et al. |
| 6,292,576 B1 | * | 9/2001 | Brownlee ...................... 382/124 |
| 6,294,100 B1 |   | 9/2001 | Fan et al. |
| 6,414,749 B1 | * | 7/2002 | Okamoto et al. ............... 356/71 |
| 6,441,482 B1 |   | 8/2002 | Foster |
| 6,765,193 B2 | * | 7/2004 | Sumriddetchkajorn ...... 250/221 |
| 7,627,151 B2 | * | 12/2009 | Rowe ................. G06K 9/00013 340/5.53 |
| 8,229,185 B2 | * | 7/2012 | Ennis et al. ........ G06K 9/00046 340/5.53 |
| 8,731,250 B2 | * | 5/2014 | Martin et al. ...... G06K 9/00033 382/124 |
| 8,872,908 B2 | * | 10/2014 | Martin et al. ...... G06K 9/00033 348/65 |
| 2005/0122308 A1 | * | 6/2005 | Bell et al. ...................... 345/156 |
| 2007/0116331 A1 | * | 5/2007 | Rowe et al. ........ G06K 9/00046 382/127 |
| 2009/0217211 A1 |   | 8/2009 | Hildreth et al. |
| 2009/0219253 A1 | * | 9/2009 | Izadi et al. ..................... 345/173 |

(Continued)

FOREIGN PATENT DOCUMENTS

TW 201115432 A 5/2011

OTHER PUBLICATIONS

D. Kumar et al., "A Brief Introduction of Biometrics and Fingerprint Payment Technology," International Journal of Advanced Science and Technology, vol. 4, Mar. 2009, pp. 25-38.

(Continued)

*Primary Examiner* — Jason Mandeville
(74) *Attorney, Agent, or Firm* — Blakely Sokoloff Taylor & Zafman LLP (57) ABSTRACT

An optical touchpad including a prism having a four-sided cross section including a light entry interface, a light exit interface, a touch interface and a back interface substantially parallel to and spaced apart from the touch interface. Collimated light enters the prism through the light entry interface, is reflected from the touch interface by total internal reflection, and exits the prism through the light exit interface. A first image sensor detects the collimated light exiting from the light exit interface and a second image sensor detects the image of an object positioned over the touch interface.

11 Claims, 9 Drawing Sheets

(56) References Cited

U.S. PATENT DOCUMENTS

2010/0044121 A1     2/2010    Simon et al.
2010/0225443 A1     9/2010    Bayram et al.
2010/0315413 A1*   12/2010   Izadi et al. .................... 345/419

OTHER PUBLICATIONS

R. Brown, "Microsoft adds touch to mouse prototypes," CNET Asia, Oct. 6, 2009, 5 pages, retrieved Oct. 29, 2012 from: http://asia.cnet.com/microsoft-adds-touch-to-mouse-prototypes-62108994.htm.

T. Stevens, "Alps Electric's 'non-contact touchpad' needs no touch," Engadget, Sep. 26, 2008, 3 pages, retrieved Sep. 6, 2011 from: http://www.engadget.com/2008/09/26/alps-electrics-non-contact-touchpad-needs-no-touch/.

TW 100143792—First Office Action with English translation, issued Apr. 15, 2014, 17 pages.

CN 201110460487.8—First Chinese Office Action with English Translation, issued Sep. 25, 2014, 21 pages.

CN 201110460487.8—Second Chinese Office Action with English Translation, issued Mar. 31, 2015, 19 pages.

* cited by examiner

OPTICAL TOUCHPAD FOR TOUCH AND GESTURE RECOGNITION

TECHNICAL FIELD

The present invention relates generally to optical devices and in particular, but not exclusively, to optical touchpads for touch and gesture recognition.

BACKGROUND

Many kinds of input devices are used with electronic devices such as computers. A mouse is probably the most common input pointing device used with a computer, but touchpads are also frequently used; almost all laptop computers are presently equipped with a touchpad. A touchpad detects the position where a user's finger touches the touchpad and uses the detected position to control a cursor on the computer screen and select commands for the computer.

Two types of electrical touchpad—resistive or capacitive—are the most common, but optical fingerprint sensors have recently become available, normally for use as a security key. For example, fingerprint sensors can be used to unlock a computer such that the computer could be operated, and even used to unlock a physical door to enter a building or room.

Optical gesture recognizers have also recently become available. A gesture recognizer uses a camera to detect an object, for example a hand. The detected image of the hand is then analyzed by a computer or processor to recognize the gesture made by the hand. The detected gesture can be used to select commands for the computer, for example in a computer and/or video game.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Embodiments of an apparatus, system and method for optical touch and gesture recognition are described. Numerous specific details are described to provide a thorough understanding of embodiments of the invention, but one skilled in the relevant art will recognize that the invention can be practiced without one or more of the specific details, or with other methods, components, materials, etc. In some instances, well-known structures, materials, or operations are not shown or described in detail but are nonetheless encompassed within the scope of the invention.

Reference throughout this specification to "one embodiment" or "an embodiment" means that a particular feature, structure, or characteristic described in connection with the embodiment is included in at least one described embodiment. Thus, appearances of the phrases "in one embodiment" or "in an embodiment" in this specification do not necessarily all refer to the same embodiment. Furthermore, the particular features, structures, or characteristics may be combined in any suitable manner in one or more embodiments.

Similar to commonly used electric touchpads, an optical touch sensor senses one or more fingertips touching a surface of the sensor—that is, there is usually physical contact between the finger and the sensor. The optical touch sensor can sense the position of a fingertip on the surface and, if it has enough resolution, can also detect the fingerprint of the fingertip. A gesture recognizer uses a camera to image the gesturing hand but, in contrast to the touch sensor, the hand cannot be too close to the camera. Hence a fingertip sensor can be used as an optical touchpad, but an optical touchpad cannot be used for gesture recognition because the gesturing hand is not touching the touchpad. An optical device that can be used as both an optical touchpad and a gesture recognizer is described below.

Figure 1:
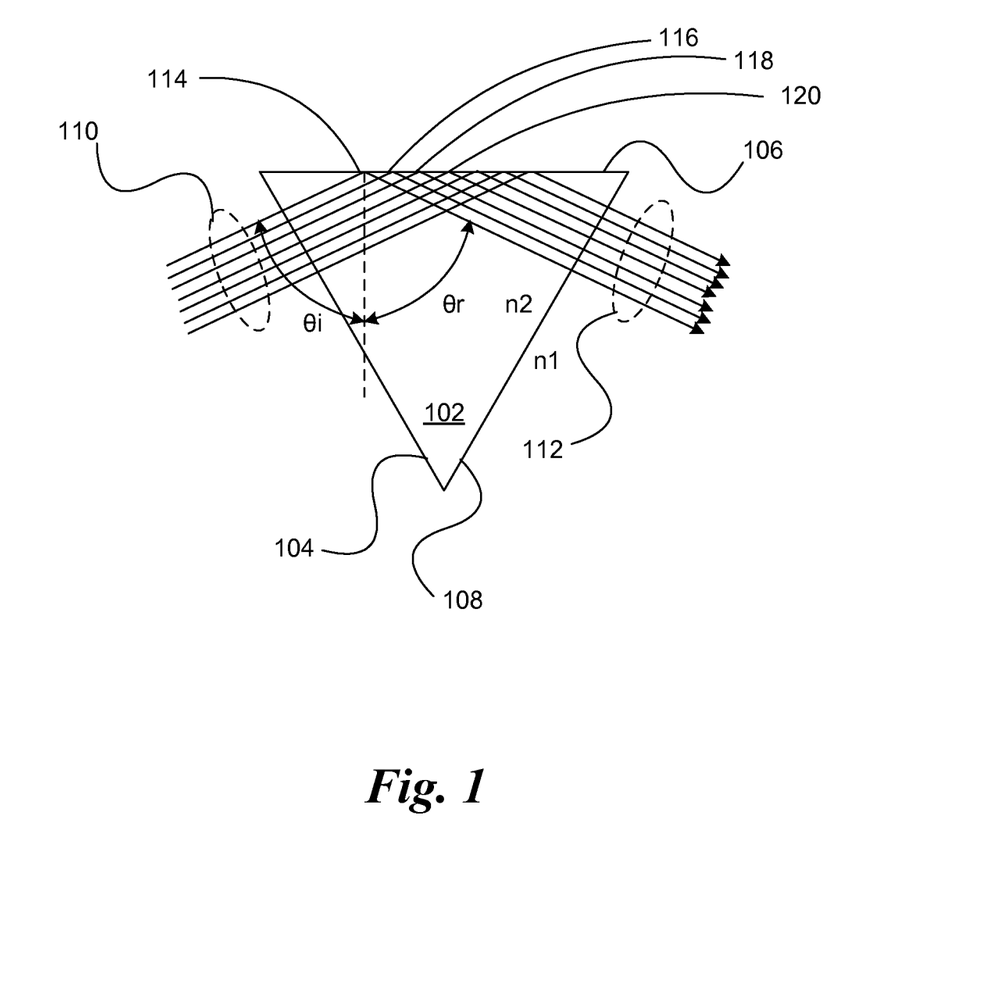
FIG. 1 is a cross-sectional drawing of an embodiment of a prism illustrating total internal reflection.

FIG. 1 illustrates the physical principle of total internal reflection in a prism 102. Prism 102 has a triangular cross-section, is made with a material having a refractive index $n_2$, and is surrounded by a medium having a refractive index $n_1$ that is different than $n_2$. As a result of its triangular cross-section, prism 102 includes three interfaces with the surrounding medium: surface 104, surface 106, and surface 108. Collimated light 110 is incident normal at interface 104, such that collimated light 110 passes through interface 104 and enters prism 102 substantially unaltered. Collimated light 110 is incident at interface 106, for example at points 114, 116, 118, 120, and so forth, with an incident angle $\theta_i$ that is larger than a critical angle $\theta_c$ at interface 106. The critical angle $\theta_c$ is defined as follows:

$$\theta_c = \sin^{-1}\left(\frac{n_1}{n_2}\right) \qquad \text{Equation (1)}$$

In an example where prism 102 is made of glass and is surrounded by air, $n_2=1.5$ (glass) and $n_1=1$ (air), meaning that critical angle $\theta_c=41.81$ deg. If incidence angle $\theta_i$ exceeds the critical angle—that is, if the condition $\theta_i > \theta_c$ is satisfied—collimated light 110 will be reflected by interface 106 instead of being transmitted through interface 106 into the surrounding medium. The reflected light 112 remains collimated and has a reflection angle $\theta_r$ that according to the law of reflection is equal to the incidence angle $\theta_i$ ($\theta_r=\theta_i$). Reflected collimated light 112 is normal to interface 108 of prism 102, and thus collimated light 112 exits prism 102 unaltered through interface 108.

Figure 2:
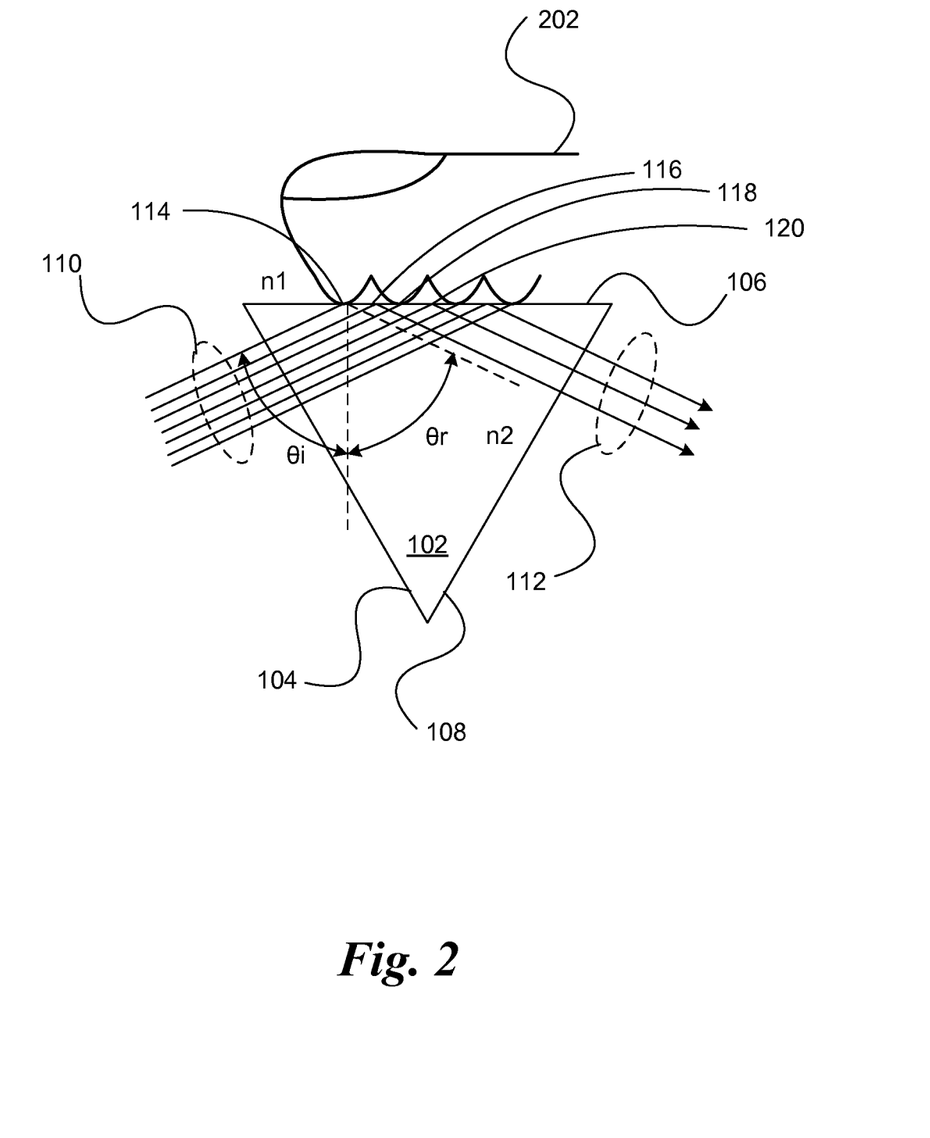
FIG. 2 is a cross-sectional drawing of an embodiment of a prism illustrating frustrated total internal reflection when a fingertip touches the prism.

FIG. 2 illustrates the principle of frustrated total internal reflection (FTIR) in prism 102 when a fingertip touches the prism. As in FIG. 1, prism 102 has a triangular cross-section and has a refractive index $n_2$ and is surrounded by medium, for example air, having refractive index $n_1$ that is different than $n_2$. Collimated light 110 is incident normal at interface 104 such that collimated light 110 enters prism 102 substantially unaltered. After entering prism 102, collimated light 110, or parts thereof, is reflected from interface 106, and exits prism 102 unaltered through interface 108. In other embodiments, collimated light 110 and reflected collimated light 112 need not be normal to interfaces 104 and 108, respectively. In these embodiments, the collimated light is deflected when it enters the prism and when it leaves the prism, but the total internal reflection condition ($\theta_i > \theta_c$) at interface 106 is properly maintained.

The tip of a finger 202 can be used to touch interface 106 of prism 102. Typically, a fingertip includes both ridges and valleys that together form a person's fingerprint. When the tip of finger 202 is pressed against interface 106, the ridges at the tip of finger 202 physically touch points 114 and 118 of interface 106. As a result of this contact, there is no longer a prism-air interface at points 114 and 118. Consequently, the critical angle given by equation (1) cannot be defined and the total internal reflection condition ($\theta_i > \theta_c$) can no longer be met. Because the total internal reflection condition cannot be met, incident collimated light 110 is not reflected at points 114 and 118 where the fingertip ridges are in contact with interface 106 but is instead scattered and/or absorbed by finger 202. Even though a thin air gap may exist between the prism and the ridge of the fingertip, the energy of the reflected light may decrease or vanish since part or all of light from inside the prism tunnels through the thin air gap to the fingertip, which is known as frustrated total internal reflection. Hence, the total internal reflection is said to be frustrated because the light rays can now pass through into the contact material (usually skin), and the internal reflection at interface 106 is no longer total. By contrast, valley parts at the tip of finger 202 have no contact with interface 106, meaning that there are prism-air interfaces at points 116 and 120. Incident collimated light 110 is therefore reflected at points 116 and 120 as collimated light 112 such as no finger 202 on prism 102.

Figure 3:
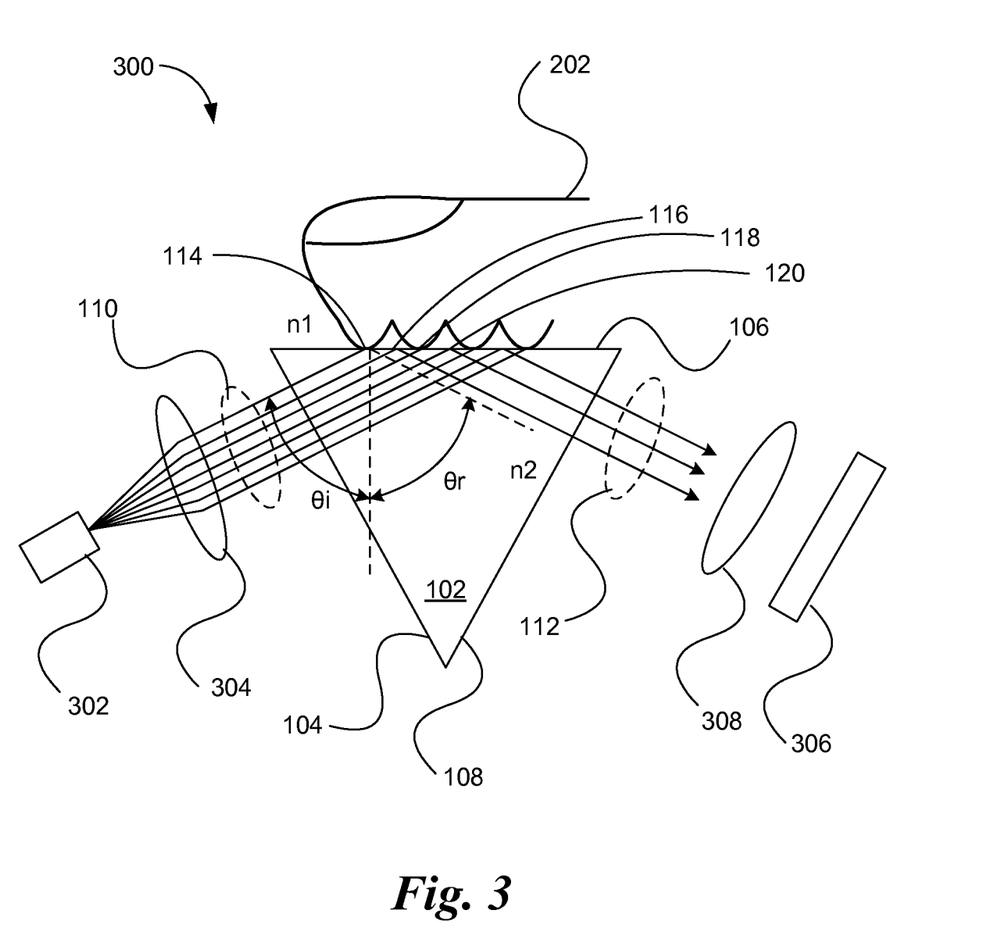
FIG. 3 is a schematic drawing of an embodiment of an optical touch detector and/or fingerprint sensor.

FIG. 3 shows an embodiment of a touch sensor 300 that relies on frustrated total internal reflection in a prism such as prism 102. Sensor 300 can include a source of collimated light that includes a light source 302 and a lens 304 that collimates light emitted by light source 302 into a collimated light beam 110. An image sensor 306 can detect collimated light 112 reflected from parts of interface 106. The detected reflected-collimated light 112 shows the presence of the tip of finger 202 on interface 106. In embodiments where image sensor 306 has sufficient resolution, image sensor 306 can also detect and image the fingerprint of finger 202: the bright parts correspond to the valleys of the fingerprint, and the dark parts correspond to the ridges of the fingerprint. A lens 308 can be included to form an image of the fingertip or fingerprint on interface 106 on image sensor 306.

Figure 4:
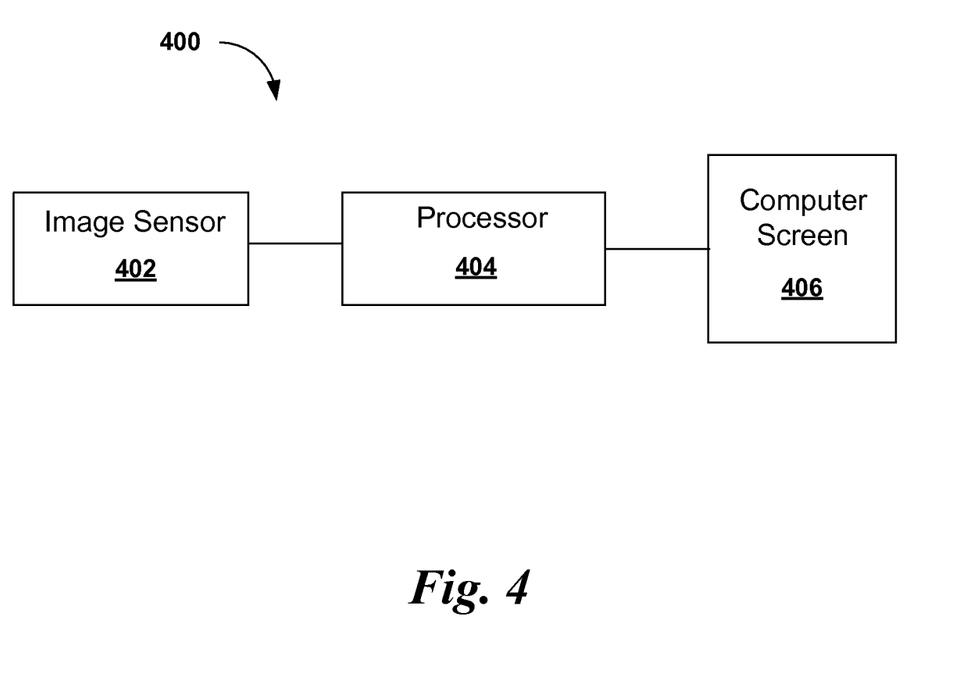
FIG. 4 is a block diagram of an embodiment of an optical sensing system.

FIG. 4 illustrates an embodiment of an image sensing system 400 including an image sensor 402. A processor or computer 404 is coupled to image sensor 402, and a display unit such as a computer screen 406 is in turn coupled to computer 404. In one embodiment of system 400 image sensor 402 can be image sensor 306 of touch sensor 300, but in other embodiments image sensor 402 can be one or both of image sensor 1032 and 1038 of touch and gesture recognition system 1000 (see FIG. 10).

Figure 5:
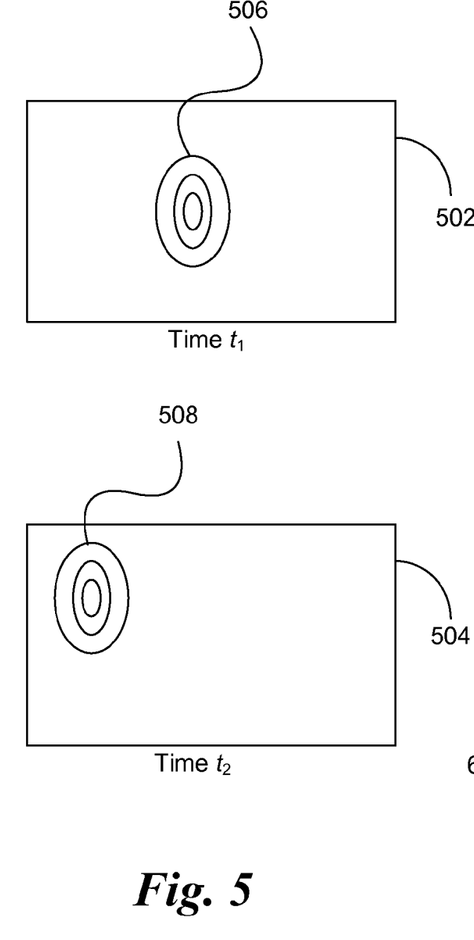
FIG. 5 is a schematic drawing of an embodiment of fingertip positions being sensed by an optical touch detector.
Figure 6:
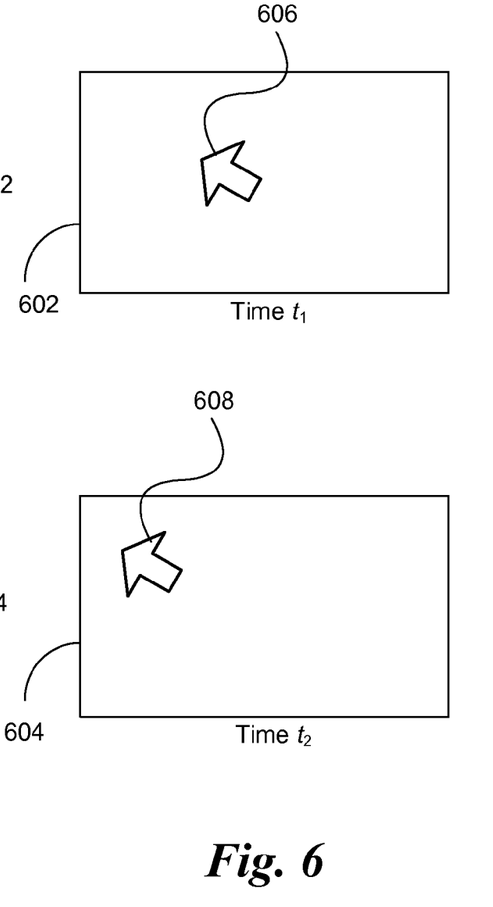
FIG. 6 is a schematic drawing of an embodiment of cursor positions on a computer screen translated from fingertip positions on an optical touch detector such as shown in FIG. 5.

FIGS. 5-6 together illustrate an embodiment of an application of optical touch sensor 300 for detecting the position of a single fingertip and/or fingerprint. In FIG. 5, at time $t_1$ image sensor 306 detects a fingerprint image frame 502 having a fingerprint pattern 506 at a first position in the image frame. In one embodiment that includes security features, fingerprint pattern 506 can have been previously registered as a legitimate input fingerprint, and the first detected fingerprint pattern prior to a time $t_1$ can also be used as a security key to unlock the computer. Alternatively, fingerprint pattern 506 may simply be recognized as any input fingerprint prior to time $t_1$. At time $t_2$, image sensor 306 detects a image frame 504 having a fingerprint pattern 508, which is the same as fingerprint pattern 506 but has shifted to a second position within the image frame.

Various computational methods can be used to find the second position relative to the first position. In one embodiment the first and second positions can be determined by correlating frame 502 and frame 504. From the correlation the movement from first fingerprint position 506 to second fingerprint position 508 can be calculated. A correlation C(p,q) of two functions f(x,y) and g(x,y) can be defined as:

$$C(p,q)=\iint f(x,y)g(x-p,y-q)dx\,dy \qquad \text{Equation (2)}$$

where f(x,y) is the first image frame 502, g(x, y) is the second image frame 504, and p and q are the x and y movements of the fingerprint position between frame 502 and frame 504. Using this correlation, a correlation peak position (p,q) is defined as the position where the correlation C(p,q) shows a peak. A correlation peak position (p, q) corresponds to the change from the first fingerprint position 506 to the second fingerprint position 508. Accordingly, computer screens 602 and 604 at times $t_1$ and $t_2$, respectively, as shown in FIG. 6, will display a cursor that moves from positions 606 to 608. The position of a cursor may be used to select commands for the computer. The correlation of frames, generation and display of cursors, and other computations can be performed by a computer or processor(s) (see, e.g., FIG. 4), but other computation methods may be used as well.

Figure 7:
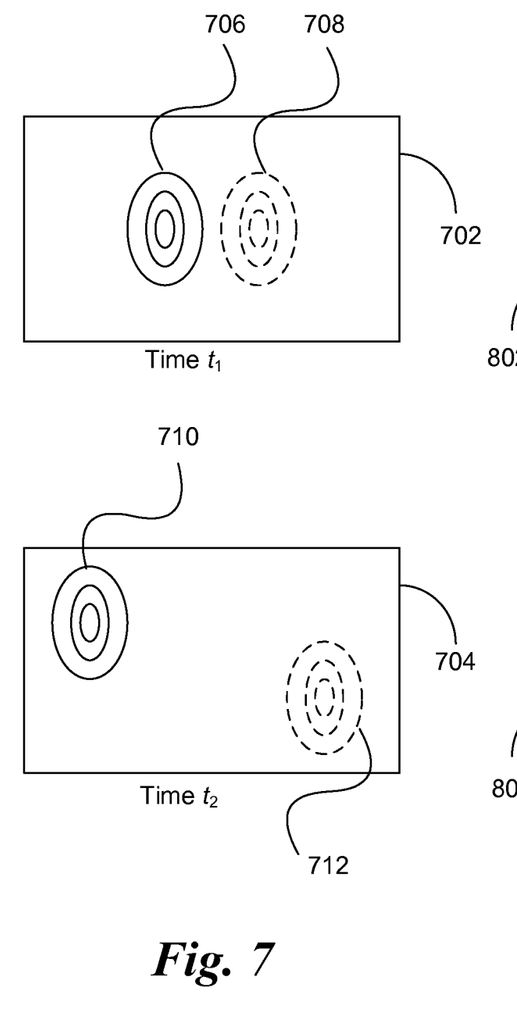
FIG. 7 is a schematic drawing of an embodiment of a pair of fingertips sensed by an optical touch detector.
Figure 8:
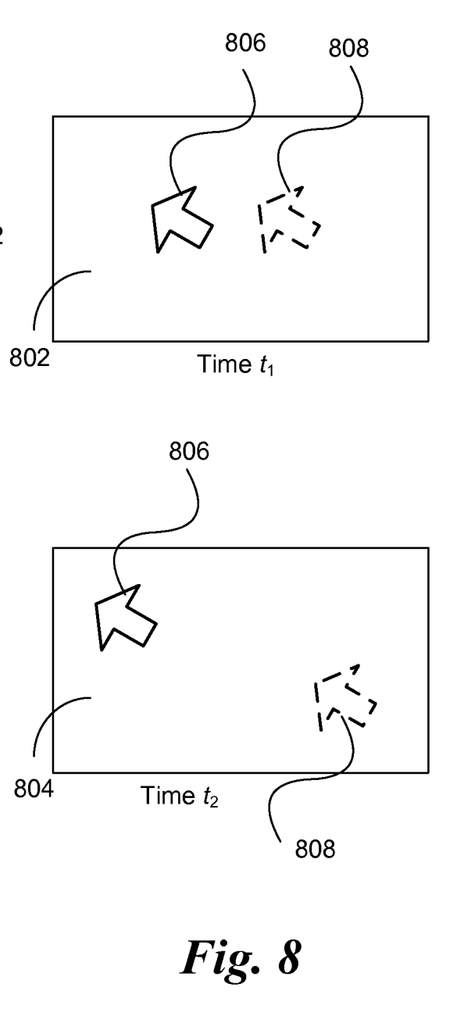
FIG. 8 is a schematic drawing of an embodiment of multiple cursor positions on a computer screen translated from fingertip position on an optical touch detector such as shown in FIG. 6.

FIGS. 7-8 together illustrate an embodiment of an application of optical touch sensor 300 for detecting the position of multiple fingerprints. FIG. 7 shows two fingers touching the touchpad at the same time. At time $t_1$, image sensor 306 detects a frame 702 having fingerprint patterns 706 at a first position and 708 at a second position. At time $t_2$, image sensor 306 detects a frame 704 having a fingerprint pattern 710, which is the same as fingerprint pattern 706 but has shifted to a third position, and a fingerprint pattern 712, which is the same as fingerprint pattern 708 but has shifted to a fourth position.

In this embodiment a correlation can also be used to determine the change in positions of the fingerprints. By taking correlation of frame 702 and frame 704, for example using equation (2), two correlation peaks will be produced. A correlation peak position (p1,q1) corresponds to the change from the first to third position of fingerprint pattern 706, another correlation peak position (p2,q2) corresponds to the change from the second to fourth position of fingerprint pattern 708. Accordingly, computer screens 802 and 804 at times $t_1$ and $t_2$, respectively, as shown in FIG. 8, will display two cursors 806 and 808 that move independently. Cursor 806 may represent fingerprint pattern 706 and cursor 808 may represent fingerprint pattern 708. The correlation of frames, generation and display of cursors, and other computations can be performed by a computer or processor(s) (see, e.g., FIG. 4), but other computation methods may be used as well.

Figure 9:
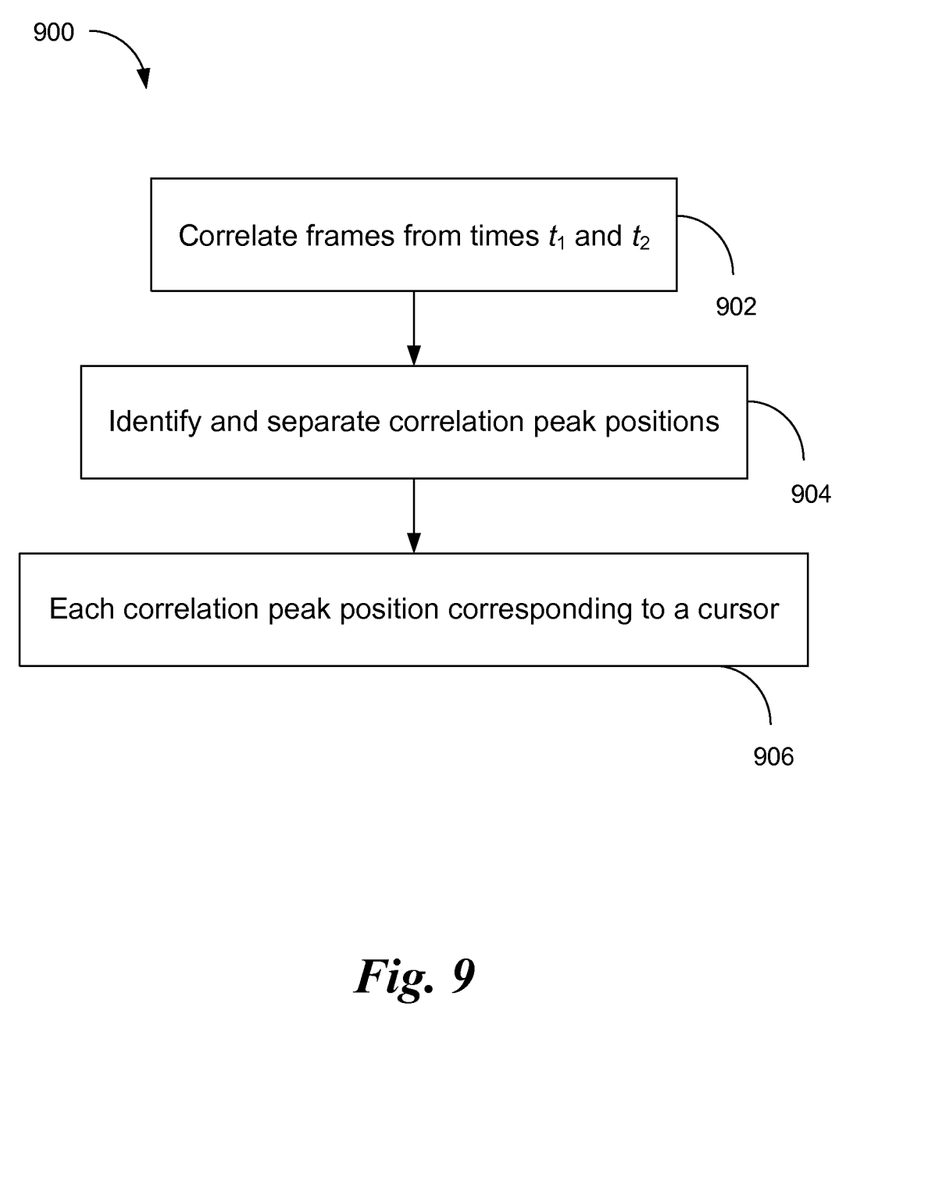
FIG. 9 is a flowchart of an embodiment of a process for translating fingertip positions on an optical touchpad into cursor positions on a computer screen, for example as shown in FIG. 5-6 or 7-8.

FIG. 9 illustrates an embodiment of a process 900 per translating finger positions on a sensor into cursor positions on a computer screen, as illustrated in FIGS. 5-8. At block 902, a processor such as processor 404 (see FIG. 4) computes the correlation of two successive frames detected by an image sensor at times $t_1$ and $t_2$. At block 904, the processor identifies and separates the computed correlation peak positions; the number of correlation peaks corresponds to the number of independent touches on the touch screen. At block 906, processor 404 generates one or more cursors on a computer screen 406 (see FIG. 4), with a cursor corresponding to each correlation peak position.

Figure 10:
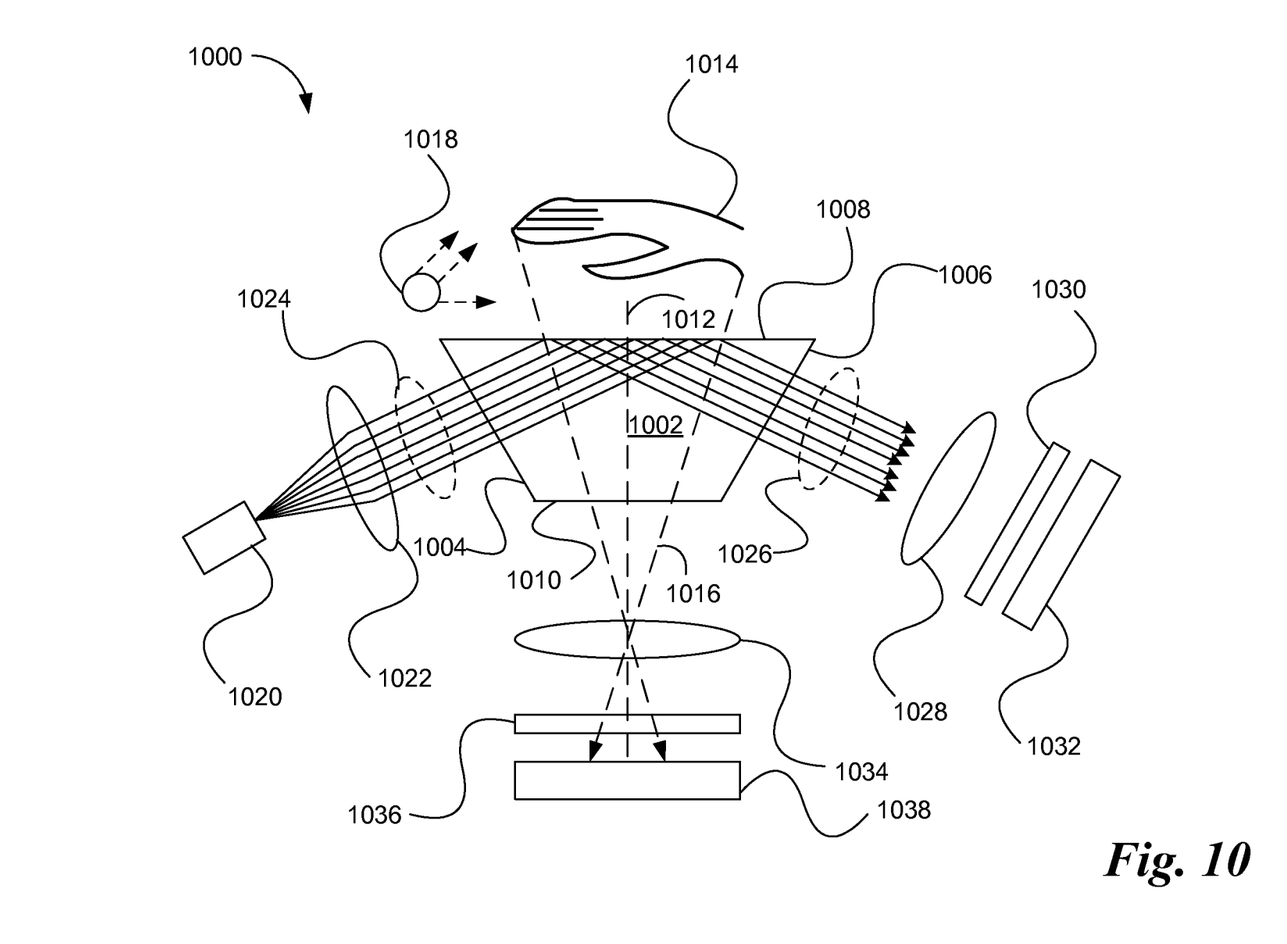
FIG. 10 is a schematic drawing of an embodiment of an optical touchpad for touch detection and gesture recognition.

FIG. 10 illustrates an embodiment of an optical touchpad 1000 capable of performing both touch detection and gesture recognition. Touchpad 1000 includes a prism 1002 having a four-sided cross section. Prism 1002 is coupled both to a source of collimated light that directs collimated light 1024 into the prism and also to an image sensor 1032 that receives light exiting prism 1002. An additional image sensor 1038 is coupled to prism 1002 to capture an image of a hand 1014 positioned over the prism.

Prism 1002 has a four-sided cross section that includes four interfaces: a light entry interface 1004, a touch interface 1008, a light exit interface 1006, and a back interface 1010. Touch interface 1008 and back interface 1010 are spaced apart from each other and are substantially parallel. An optical axis 1012 of the prism is substantially normal to touch interface 1008 and back interface 1010. Light entry interface 1004 and light exit interface 1006 connect the touch interface and the back interface and are positioned at an angle relative to optical axis 1012, such that the cross-sectional shape of prism 1002 is substantially trapezoidal. In other embodiments, however, prism 1002 can have a different quadrilateral cross-sectional shape or can have a cross-sectional shape that is not quadrilateral.

Light source 1020 is optically coupled to an optical element such as lens 1022 that can shape light from light source 1020 into a beam of collimated light 1024 that is directed toward light entry interface 1004. In one embodiment light source 1020 emits in the infrared wavelength range, but in other embodiments light source 1020 can emit in other wavelength ranges, such as the visible or ultra-violet ranges. In the illustrated embodiment optical element 1022 is a refractive lens, but in other embodiments it could be reflective or diffractive optical element.

Image sensor 1032 is positioned to capture one or more images of touch interface 1008 based on light reflected from the touch interface. Collimated light 1024 is reflected from touch interface 1008 and becomes reflected collimated light 1026. Reflected collimated light 1026 exits prism 1002 through light exit interface 1006. An optical element 1028 is positioned in the path of reflected collimated light 1026 to focus an image of touch interface 1008 onto image sensor 1032. In the illustrated embodiment optical element 1028 is a refractive lens, but in other embodiments it could be reflective or diffractive optical element.

An additional image sensor 1038 is positioned along optical axis 1012 to capture one or more images of an object, such as hand 1014 that is positioned above touch interface 1008. In the illustrated embodiment hand 1014 is illuminated by light source 1018, but in other embodiments hand 1014 can be illuminated by ambient light. An optical element 1034 is positioned along optical axis 1012 to focus an image of hand 1014 onto image sensor 1038. In the illustrated embodiment optical element 1034 is a refractive lens, but in other embodiments it could be reflective or diffractive optical element.

To enhance the signal-to-noise ratio of the signal detected by image sensors 1032 and 1038, in one embodiment light sources 1020 and light 1018 can have different wavelengths. For example, incident light source 1020 can emit infrared light having wavelength range $\lambda_1$, while light source 1018 emits visible light having wavelength range $\lambda_2$, where $\lambda_1$ and $\lambda_2$ do not overlap. Accordingly, in one embodiment of optical touchpad 1000 a filter 1030 that passes wavelength range $\lambda_1$ can be disposed in front of image sensor 1032, either before or after optical element 1028, and a filter 1036 that passes $\lambda_2$ may be disposed in front of image sensor 1038, either before or after optical element 1034. Filters 1030 and 1036 can be adjusted accordingly in an embodiment where hand 1014 is illuminated by ambient light instead of light from light source 1018.

Touch sensor 1000 operates as both a touch detector and a gesture recognizer. During touch detection, light emitted by light source 1020 is collimated by optical element 1022 into collimated light 1024, which is then directed into prism 1002 through light entry interface 1004. In the illustrated embodiment, collimated light 1024 is incident on light entry interface 1004 at an incidence angle of substantially 0 degrees (i.e., substantially normal to entry interface 1004), but in other embodiments collimated light 1024 can be incident on light entry interface 1004 at other angles.

After entering prism 1002, collimated light 1024 is reflected from touch interface 1008 and becomes reflected collimated light 1026. If no fingertip is in contact with touch surface 1008, collimated light 1024 is fully reflected by total internal reflection at interface 1008, but if there is a fingertip in contact with touch interface 1008 then collimated light 1024 is only partially reflected in accordance with frustrated total internal reflection. Reflected collimated light 1026 exits prism 1002 through light exit interface 1006. In the illustrated embodiment, reflected collimated light 1026 is incident on light exit interface 1006 at an incidence angle of substantially 0 degrees (i.e., substantially normal to exit interface 1006), but in other embodiments reflected collimated light 1026 can be incident on light exit interface 1006 at other angles.

After exiting prism 1002, reflected collimated light 1026 is focused by optical element 1028, filtered by filter 1030 if present, and directed onto image sensor 1032 for image capture. The one or more images captured by image sensor 1032 can then be processed by circuitry and logic coupled to image sensor 1032 (see FIG. 4). In one embodiment the images can be processed as described in connection with FIGS. 5-8, but in other embodiments other types of processing can be used.

For gesture recognition, hand 1014 is positioned above touch interface 1008 and is illuminated by ambient light or, if present, by light source 1018. Light 1016 from hand 1014 enters prism 1002 through touch interface 1008, passes through the prism, and exits through back interface 1010. After exiting through back interface 1010, light 1016 is focused by optical element 1034, filtered by filter 1036 if present, and directed onto image sensor 1038 for image capture. The one or more images captured by image sensor 1038 can be processed by circuitry and logic coupled to the image sensor (see FIG. 4) to determine the gesture being made by the hand. No total internal reflection occurs when light 1016 from hand 1014 propagates to image sensor 1038 by passing through prism 1002.

Figure 11:
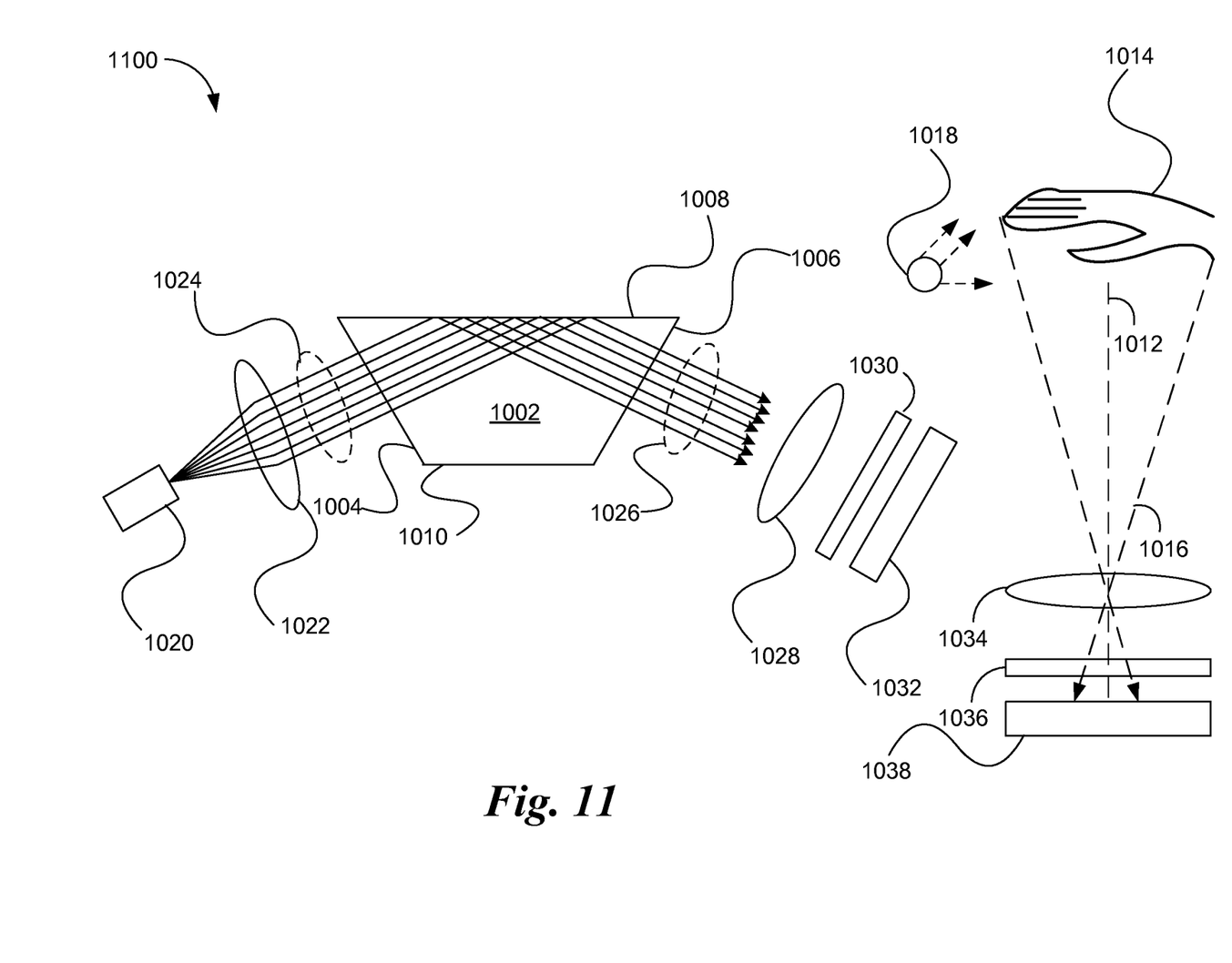
FIG. 11 is a schematic drawing of an alternative embodiment of an optical touchpad for touch detection and gesture recognition.

FIG. 11 illustrates an alternative embodiment of an optical touchpad 1100 for touch and gesture detection and recognition. Optical touchpad 1100 shares many similarities with optical touchpad 1000. The primary difference between the two optical touchpads is that in optical touchpad 1100 imaging lens 1034, and image sensor 1038 can be disposed at another location, such that light 1016 from object 1014 does not pass through prism 1002. Imaging lens 1034 is positioned adjacent to prism 1002 for forming an image of object 1014. Accordingly, back interface 1010 parallel to touch interface 1008 is not required. Additionally, optical touchpad 1100 can optionally use filter 1036 to improve the signal-to-noise ratio, but in other embodiments filter 1036 need not be used.

The above description of illustrated embodiments of the invention, including what is described in the abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description.

The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

The invention claimed is:

1. An optical touchpad comprising:
    a prism having a four-sided cross section including a light entry interface, a light exit interface, a touch interface and a back interface substantially parallel to and spaced apart from the touch interface;
    a source of collimated light, wherein the collimated light enters the prism through the light entry interface, is reflected from the touch interface by total internal reflection, and exits the prism through the light exit interface, and wherein the source of collimated light emits light in a first wavelength range;
    a first image sensor for detecting the collimated light exiting from the light exit interface;
    a lens for forming an image of a hand positioned above the touch interface through the touch interface and the back interface, wherein the hand forms a gesture but does not touch the touch interface, wherein the hand is illuminated by an imaging light source different than the source of collimated light, and wherein the imaging light source emits light in a second wavelength range;
    a second image sensor comprising a two-dimensional array of light-sensitive elements and optically coupled to the lens wherein the second image sensor can capture a two-dimensional image of the hand; and
    a processor coupled to the second image sensor, wherein the processor can read the two-dimensional image of the hand and process the two-dimensional image to identify the gesture;
    a first filter disposed between the light exit interface and the first image sensor, wherein the first filter passes the first wavelength range; and
    a second filter disposed between the prism and the second image sensor, wherein the second filter passes the second wavelength range.

2. The optical touchpad of claim 1 wherein the prism has a substantially trapezoidal cross section.

3. The optical touchpad of claim 1 wherein the source of collimated light comprises:
    a light source; and
    a collimating lens coupled to the light source.

4. The optical touchpad of claim 1 wherein the first wavelength range is infrared light, and the second wavelength range is visible light.

5. The optical touchpad of claim 1, further comprising a second lens that images the touch interface of the prism onto the first image sensor.

6. The optical touchpad of claim 1, further comprising a processor coupled to the first image sensor.

7. A method for fingertip and gesture imaging, the method comprising:
    directing collimated light into a prism having a four-sided cross section including a light entry interface, a light exit interface, a touch interface and a back interface substantially parallel to and spaced apart from the touch interface, wherein the collimated light has a first wavelength range and enters the prism through the light entry interface, is reflected from the touch interface by total internal reflection, and exits the prism through the light exit interface;
    imaging the collimated light exiting from the light exit interface to obtain an a two-dimensional image of the touch interface wherein imaging the collimated light exiting the light exit interface comprises:
        directing the collimated light through a first lens and a first filter that passes the first wavelength range onto a first image sensor, and
        capturing an image of the touch interface using the first image sensor;
    imaging a hand positioned above the touch interface, wherein the hand forms a gesture and is illuminated by an imaging light source different than the collimated light that emits light in a second wavelength range, and wherein imaging the hand comprises:
        using a second lens to direct light from the hand through the touch interface and back interface of the prism and through a second filter that passes the second wavelength range onto a second image sensor comprising a two-dimensional array of pixels, wherein the hand is not touching the touch interface, and
        capturing a two-dimensional image of the hand using the second image sensor; and
    processing the two-dimensional image to identify the gesture.

8. The method of claim 7 wherein the prism has a substantially trapezoidal cross section.

9. The method of claim 7 wherein the first wavelength range is infrared light, and the second wavelength range is visible light.

10. The optical touchpad of claim 1 wherein the imaging light source is ambient light.

11. The optical touchpad of claim 7 wherein the imaging light source is ambient light.

* * * * *